United States Patent [19]

Leclercq

[11] Patent Number: 4,912,751

[45] Date of Patent: Mar. 27, 1990

[54] METHOD AND DEVICE FOR ESTABLISHING AND WRITING A LUMINOUS PATTERN

[76] Inventor: Didier Leclercq, 115 Rue du Faubourg Poissonnière, 75009 Paris, France

[21] Appl. No.: 192,762

[22] Filed: May 10, 1988

[30] Foreign Application Priority Data

May 13, 1987 [FR] France ................ 87 06722

[51] Int. Cl.$^4$ ............................................. G03B 21/00
[52] U.S. Cl. ......................................... 353/44; 353/95
[58] Field of Search .................. 33/28, 42, 44, 45, 62, 33/121, 122, 95

[56] References Cited

U.S. PATENT DOCUMENTS

| | | | |
|---|---|---|---|
| 2,859,659 | 11/1958 | Fenske et al. | 33/26 X |
| 3,364,606 | 1/1968 | Wengryn | 40/159.2 X |
| 4,026,644 | 5/1977 | Tsuchida et al. | 353/44 |
| 4,254,552 | 3/1981 | Samis . | |
| 4,609,268 | 9/1986 | Crawford . | |

FOREIGN PATENT DOCUMENTS

| | | | |
|---|---|---|---|
| 0007125 | 1/1980 | European Pat. Off. . | |
| 0253081 | 1/1988 | European Pat. Off. . | |
| 1503720 | 12/1967 | France . | |
| 2346736 | 10/1977 | France . | |
| 344182 | 3/1931 | United Kingdom | 353/44 |

OTHER PUBLICATIONS

"New PNC Programming Aid" Newing Hall Ltd.-Metalworking Production, vol. 129, No. 2, Feb. 1985-p. 67.

Primary Examiner—Harry N. Haroian
Attorney, Agent, or Firm—Charles E. Brown; Charles A. Brown

[57] ABSTRACT

In a method of establishing and writing a pattern which, when placed in a light beam from a projector, produces an illuminated area of any shape and size displayed on a screen, a reference point is defined which, when projected onto the screen, forms a contrasted light area thereon. The reference point is moved in the light beam so that its trajectory defines an illuminated area of required shape displaying this movement. This trajectory is written onto a pattern storage device simultaneously with or subsequently to movement of the reference point. The device for implementing this method comprises a plate incorporating a plurality of writable locations, a displacement device for moving from location to location, a pattern defining device, a memorizing device and a pattern writing device. The method and device are primarily intended for use in the theatre and entertainment for producing luminous decorative effects and luminous areas related to the decor, objects and persons in the projection space.

18 Claims, 3 Drawing Sheets

METHOD AND DEVICE FOR ESTABLISHING AND WRITING A LUMINOUS PATTERN

BACKGROUND OF THE INVENTION

1. Field of the Invention

The present invention concerns a method and a device for establishing and writing a pattern which, after it is placed in the light beam from a projector, forms an illuminated area. To be more specific, a pattern of this kind can be projected onto a stage so as to create a decorative lighting effect.

2. Description of the Prior Art

It is already known to provide an opaque plate with a transparent area adapted to allow a light beam to pass only through the interior of said area.

This area may be of any appropriate shape, such as a star shape, for example. When a light beam passes through this area the shape of the area is reproduced on a stage or on a screen.

In the theatre it is routine practice to use a plate of this kind provided with a transparent area to provide decorative lighting effects on a stage.

There are commercially available plates provided with transparent areas of predefined shape. The user of plates of this kind cannot make his own plates comprising the patterns he needs. Furthermore, the user cannot create his own plates as a show progresses and is obliged to prepare in advance all the patterns that will be needed.

The object of the invention is to overcome these advantages by creating a method and a device enabling the user to define and then to "write" his own patterns in a simple and fast way.

Another object of the present invention is to enable the user to create a luminous space of any shape and size using only one or more projection devices in accordance with the invention associated with a single and simple drafting machine and an appropriate recording device.

SUMMARY OF THE INVENTION

In one aspect, the present invention consists in a method of establishing and writing a pattern which, when placed in a light beam from a projector, produces an illuminated area of any shape and size displayed on a screen, which method comprises the steps of:

defining a reference point which when projected onto said screen forms a contrasted light area thereon, moving said reference point in said light beam so that its trajectory defines an illuminated area of required shape and displaying this movement, and writing said trajectory onto pattern storage means simultaneously with or subsequently to said movement of said reference point.

In another aspect, the present invention consists in a device for defining, recording and projecting patterns adapted to be placed in a light beam from a projector to create an illuminated area displayed on a screen, comprising:

a plate comprising a plurality of writable locations, a displacement device for moving from location to location, a pattern defining device, a memorizing device, and a pattern writing device.

By virtue of these provisions the user is able to define the patterns he needs for himself, beforehand or during a show. He can enlarge or reduce the shape projected onto the screen at will from a control console and without having to manipulate in any way whatsoever the plate serving as a support for the patterns.

Other objects, characteristics and advantages of the invention will emerge from the following description given by way of example with reference to the appended drawings.

DESCRIPTION OF THE PREFERRED EMBODIMENTS

Figure 1:
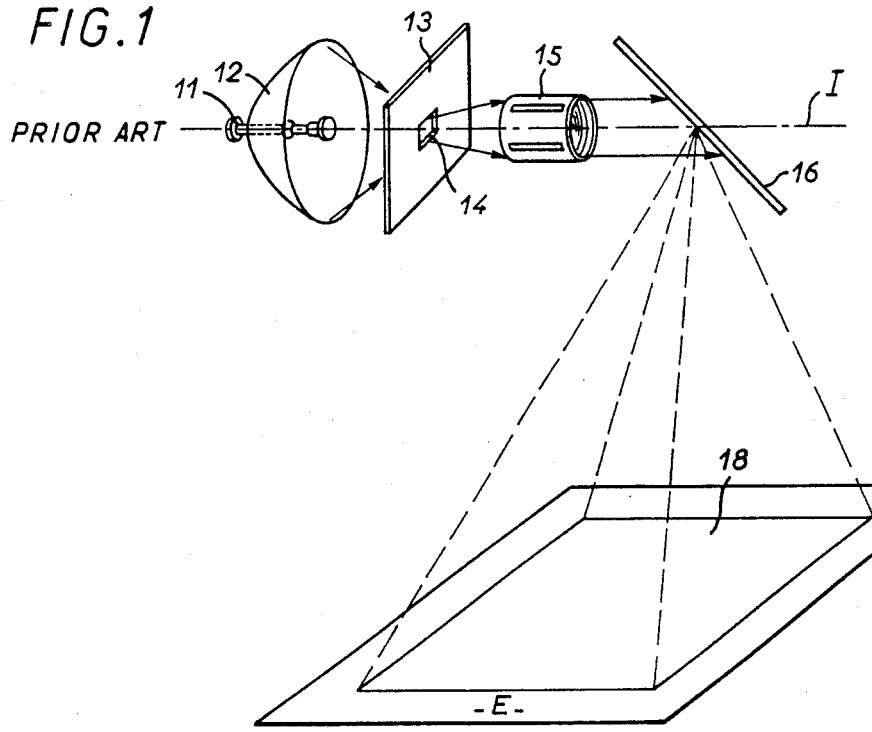
FIG. 1 is a schematic view in perspective of a known type projection device.
Figure 2:
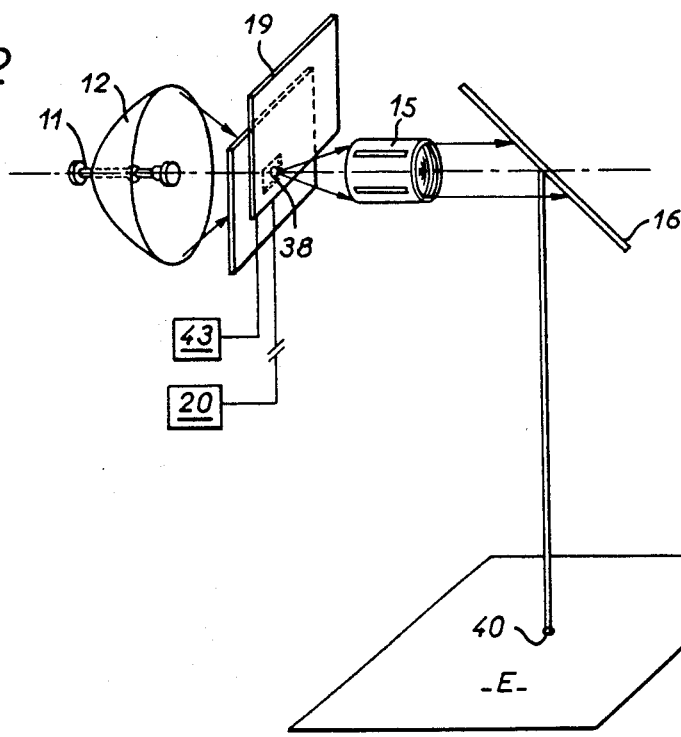
FIG. 2 is a schematic view is perspective of a first embodiment of a projection device in accordance with the invention.
Figure 3:
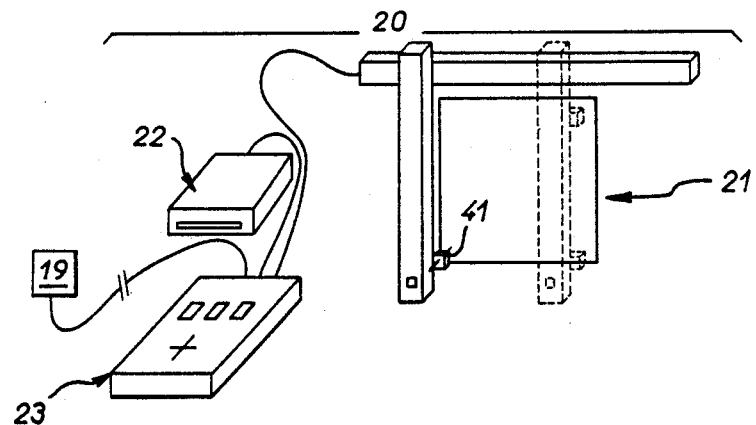
FIG. 3 is a schematic view in perspective showing the control device for the first embodiment of projection device in accordance with the invention.
Figure 4:
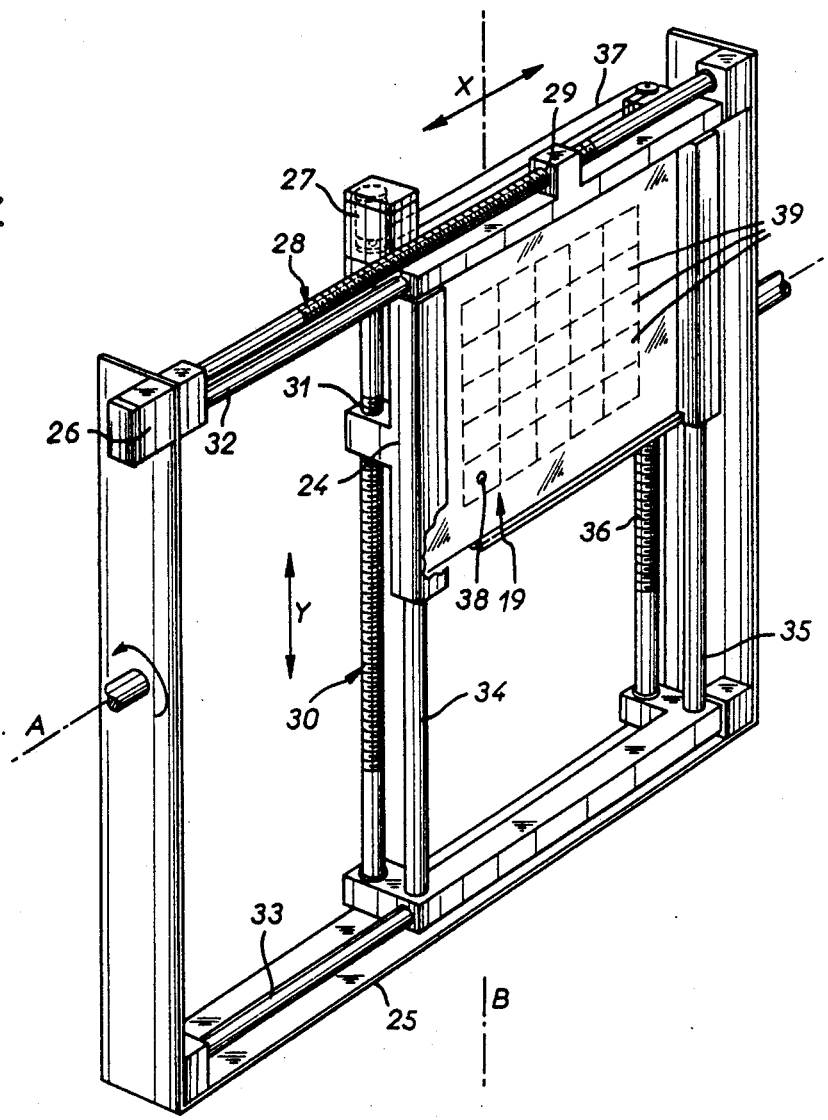
FIG. 4 is perspective view showing a writable plate and mechanisms for displacing the plate.

A known type projection device (FIG. 1) comprises a lamp 11, an elliptical reflector 12, a plate 13 comprising a projection window 14, an objective lens 15 and a mirror 16.

When a light beam is emitted by the lamp 11 along an optical axis I there is obtained on a screen E after reflection from the mirror 16 an illuminated surface 18 reproducing the shape of the projection window 14. The "screen" E may be of any kind. It may comprise a stage or a screen in the strict sense.

The device in accordance with the invention as described with reference to and shown in FIGS. 2 through 5 further comprises, unlike a conventional projection device, a writable plate 19 connected to a control device 20 for the plate and a writing device 43.

The control device 20 for the writable plate (FIG. 3) comprises a drafting machine 21, a recording device 22 and a device 23 for positioning the writable plate.

The writable plate 19 is held in place by a support 24 (FIG. 4) in turn joined to a frame 25. The support 24 is movable in two directions X and Y by two motors 26 and 27.

The motor 26 rotates a transverse lead screw 28 coupled to the support 24 by a screwthread 29 and the motor 27 rotates a longitudinal lead screw 30 coupled to the support 24 by a screwthread 31.

The support 24 slides on transverse guides 32 and 33 and longitudinal guides 34 and 35.

A second longitudinal lead screw 36 is rotated simultaneously with the longitudinal lead screw 30 by means of a chain transmission system 37.

The frame 25 can pivot about two perpendicular axes A and B.

The writable plate 19 comprises a glass plate of which one surface is covered with a material that is opaque except at on point, referred to herein as the reference point 38, which is transparent.

The plate 19 is adapted to carry marks made in locations 39 (shown in dashed outline in FIG. 4) which are not physically delimited on the plate 19 but the shapes and sizes of which are known to the device in accordance with the invention.

The writing device 43 (FIG. 5) comprises a control unit 44 for a scriber 42 carried by an arm 45 which pivots about an axis C.

The scriber 42 is movable along an axis Z by a solenoid which holds it either away from the writable plate 19 or in contact with the plate.

Figure 5:
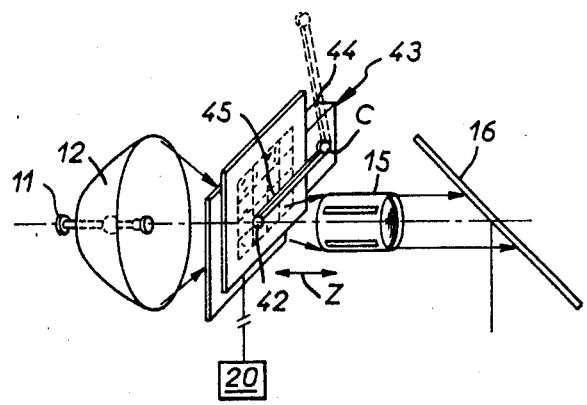
FIG. 5 is a schematic view in perspective showing the writing device of the first embodiment of the invention.

The pivoting arm 45 has a working position as shown in full outline in FIG. 5 and an idle position as shown in dashed outline.

The functioning of the device in accordance with the invention is described hereinafter.

The light beam emitted by the lamp 11 (FIG. 2) passes through the projection window 14 of the plate 13 and the reference point 38 of the writable plate and then the objective lens 15, before it is reflected from the mirror 16 towards the screen E where it creates a light spot 40.

A user in visual contact with tee screen E then places the tip of a pencil 41 into a pencil suport device of the drafting machine 21.

When the user moves the pencil 41 on the drafting machine the movement that he makes is transmitted to the position control device 23 and thence to the motors 26 and 27 which move the writable plate 19 and therefore the reference point 38 in a corresponding way in the light beam emitted by the lamp 11. In this way the light spot 40 describes a movement on the screen E proportional to that described by the pencil 41 of the user on the drafting machine.

It will therefore be seen that the user can draw and/or write with the light spot 40, that is to say move the light spot 40 over the screen E in any way, simply by drawing and/or writing with a pencil 41, that is to say by moving the pencil 11 on the drafting machine.

When the user no longer wishes to move a light spot over a screen but to project onto this screen a luminous contour that he has himself defined, he proceeds as follows.

Initially the user moves his pencil 41 on the drafting machine according to the pattern that he wishes to project with the recording device 22 functioning. As in the case previously described the light spot 40 moves over the screen E in a manner proportional to the displacement of the pencil 41. When all of the pattern that the user wishes to project has been "written" the recording device 22 is shut off. The recording device has then memorized the movement of the writable plate 19 in the light beam to create the pattern required by the user.

At the start of recording of the required pattern by the recording device 22 the writable plate 19 is positioned so that the reference point 38 is on the optical axis I.

The user then selects by means of the positioning device 23 the location 39 on the writable plate 19 that he wishes to write. The center of the selected location 39 is then positioned on the optical axis 1 by virtue of the motors 26 and 27 moving the writable plate 19.

The solenoid is then activated to place the scriber 42 in contact with the center of the selected location 39.

The recording device 22 then commands movement of the writable plate 19 according to the data that it has memorized.

The scriber 42 then scratches through the opaque film covering the-selected location 39, according to the movement of the writable plate 19.

When all of the recorded pattern has been reproduced on the selected location 39 in this way it is sufficient to de-activate the solenoid of the scriber to remove the latter from contact with the writable plate. The pivoting arm 45 is then placed in the idle position by commanding rotation of the arm 45 about the axis C.

Throughout the duration of the writing, if the lamp 11 emits a light beam the pattern that it is wished to reproduce is projected as its writing on the screen E proceeds.

When it is wished to project a pattern already written, the arm 45 carrying the scriber is placed in the idle position.

The user has thus made for himself a written pattern which can be projected onto a screen. It is thus a simple matter to build up a library of original patterns for projection.

It is of course possible to memorize any number of patterns and to write only some of them. The locations 39 to be written can be written in any order.

When a writable plate 19 is entirely written it is removed from the plate support and replaced with a blank plate. The number and size of the locations 39 are not limited, but must be indicated to the positioning device.

The writing operation as described is performed in two separate stages, but in reality these two stages may be combined into one. Thus it is possible to write directly onto the plate 19 a pattern made directly on the drafting machine and not memorized by the recording device 22.

The patterns written maY be of any shape and kind, comprising luminous contours (stars, squares, etc) or filled-in shapes (disks, checkerboards, etc). Note that by making a drawing in perspective the projection can give the illusion that the drawing is in three dimensions. Also, the same writable location 39 can carry several different patterns so that when this location is illuminated all of the stage or the screen is filled with luminous shapes, objects or contours.

It is of course possible to make one after the other drawings intended to be projected one after the other, by providing a halt between drawings or by carrying out a sequence of drawings that is not delimited between them or by producing cross-fades. In the latter case it is necessary to use two devices in accordance with the invention.

Figure 6:
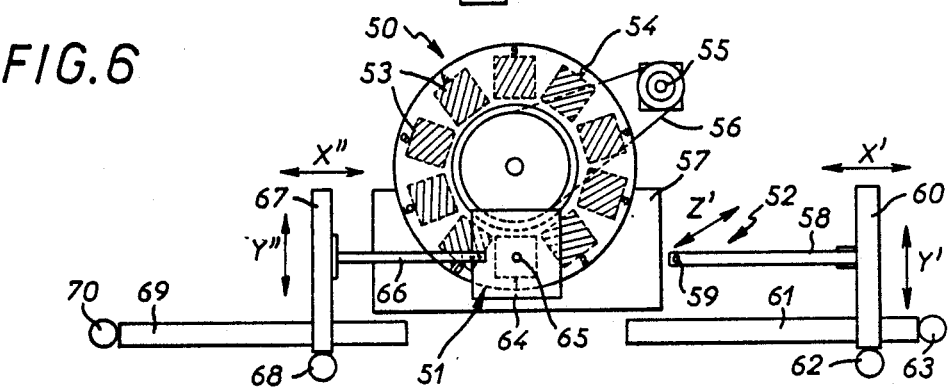
FIG. 6 is a schematic view showing a writable plate, a reference point system and a writing device in a second embodiment of the invention.
Figure 7:
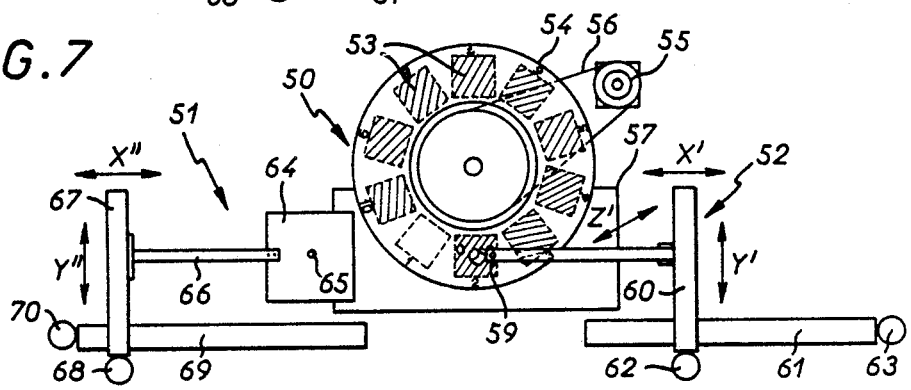
FIG. 7 is a view analogous to FIG. 6 showing the second embodiment of the device in accordance with the invention in the writing position.
Figure 8:
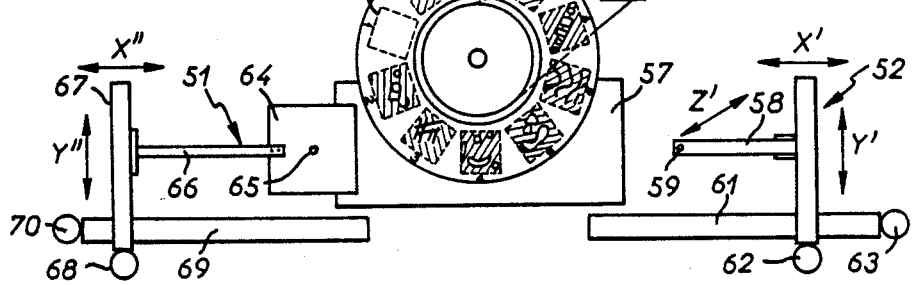
FIG. 8 is a view analogous to FIG. 6 showing the second embodiment of the device in accordance with the invention in the projection or idle position.

FIGS. 6 through 8 show a second embodiment of a writable plate 50, a reference point system 51 and a writing device 52 in accordance with the invention.

In this second embodiment the writable plate 50 comprises a disk 54 on which are locations 53 not delimited physically but known to the device in accordance with the invention.

The disk 54 is rotated about an axis D by a drive motor 55 transmitting its motion to the disk 54 through the intermediary of a chain 56.

The disk 54 is made from a material that is opaque except that one of the locations is translucent.

As previously the disk 54 receives a light beam from a lamp (not shown) through the intermediary of a projection window (not shown) carried by a plate 57.

The writing device 52 comprises an arm 58 provided at its free end with a scriber 59 movable by a solenoid along an axis X'. The arm 58 is slid along a axis Y' on a vertical support 60 by a motor 62. The vertical suport 60 is moved along an axis X' on a guide 61 by a motor 63.

Thus the scriber 52 can be moved along three axes X', Y', Z'.

The reference point system 51 comprises an opaque plate 64 on which is a translucent reference point 65. This plate is fixed by means of an arm 66 slid along an axis Y" on a guide 67 by a motor 68.

The guide 67 is slid along an axis X" on a guide 69 by a motor 70.

The reference point system 51 is therefore movable along two axes X" and Y". Also, the displacement of the reference point system 51 is analogous to the displacement of the writing device 52.

The functioning of the device shown in FIGS. 6 through 8 is explained hereinafter.

When the device in accordance with the invention is idle or is being used for projection (see FIG. 8) the writing device 52 and the reference point system 51 are moved away from the disk 54 and outside the light beam from the lamp (not shown).

When it is required to memorize a pattern or to move the light spot over the screen E the reference system 51 is placed in front of the disk 54 (FIG. 6) so that the reference point 65 on the opaque plate 64 is at the center of the translucent location on the disk 54.

As in the previous embodiment, the movement of a pencil on a drafting machine procures proportional displacement of the reference point 65 in front of the disk 54. The disk 54 is fixed, of course. The movement of the reference point 65 to create a pattern can be memorized, as in the first embodiment.

When it is required to write a memorized pattern (FIG. 7) the reference point system 51 is moved along the axis X" so that it is not in front of the disk 54.

A writable location 53 is then selected by rotating the disk 54 so that this writable location is placed in the position that the translucent location occupied when the pattern was memorized. The writing device 52 is then moved along the X' axis so that the scriber is placed at the center of the selected opaque location 53. The scriber is then brought into contact with this selected location. The writing device is moved according to the data recorded during movement of the reference point system 51. This data is, of course, processed by a computation unit (not shown) since the reference point system 51 and the writing device 52 move in opposite directions. In practise, this computation unit may simply be a polarity inverter. During the writing operation the disk 54 is fixed.

As an alternative to this, the writing device and the reference point system may be placed on the same side of the writable disk 54. The movements of the reference point system and the writing device are then analogous.

Note that as in the first embodiment the patterns memorized and/or written may be or any shape and kind and that the same location 53 can comprise a number of separate patterns. Note that the two embodiments described hereinabove are intended to be used with a computer. The data may therefore be memorized advantageously on diskette or any appropriate medium.

Likewise, the reference system could be an opaque point on a luminous screen rather a luminous point on an opaque screen.

Note also that in another alternative arrangement the writing device might be replaced by a marking device designed to render opaque originally translucent locations on a plate or disk. The operating principle is nevertheless analogous.

Note that recording each pattern makes it possible, when the device in accordance with the invention is used in some place other than that in which the patterns were recorded, to adapt to the new dimensions of the screen by multiplying (or dividing) the data corresponding to the recorded pattern by an appropriate factor.

It is possible to combine a number of projector devices equipped with plates or disks in accordance with the invention with a single drafting machine, a recording device and a device for controlling the projection devices separately or together.

A third embodiment of the present invention (not shown) consists in a simplified device comprising a writable medium, a reference point system and a writing device.

The writable medium is in this case a strip of transparent plastics material divided into a plurality of locations disposed one after the other on the strip. This strip is movable in the light beam from a projector by appropriate motors so that each location may be moved into the light beam.

The reference point system is a point which moves in the light beam from the projector. This point is moved between the strip to be written and an objective lens of the type shown in FIG. 1. When the reference point system is moved in the light beam it creates a shadow which moves on an entirely lit stage or screen. The movement of this reference point is obtained by corresponding movement of a pencil on a drafting machine. The movement o a reference point of this kind may be memorized for transmission to a writing system the function of which is to render opaque an initially translucent location on the strip medium to reproduce the memorized luminous contour in reverse. The memorized contour comprises a dark area on an entirely lit stage and must therefore be converted by the writing device into a light area projected onto an unlit stage. This reversal is not mandatory, however, and everything depends on the required effect.

The writing device consists of a pencil depositing a color onto a location of the strip forming the writable medium.

Note that it is possible to obtain in this way colored luminous images or contours.

The memorizing and the writing of a pattern may be performed at the same time, of course.

It is, of course, possible to delimit on the location of the strip forming the writable medium the various areas to be rendered opaque and to render them opaque by simple hand coloring. This minimizes the cost of a device of this kind.

Of course, the invention is not limited to the embodiments chosen and it is possible to envisage other variations thereon without departing from the scope of the invention. For example, the storage means (plate or disk) can be any shape and size.

Note that it is always possible to create a colored light pattern in any embodiment. In the first and second embodiments it is sufficient for the plate carrying the opaque film to be colored, or for one or more colors to be deposited manually or automatically onto the plate at the places where the opaque film has been removed.

The present invention makes it possible to create contours and therefore also makes it possible to record the contour of an existing object irrespective of its size. Because of this, and although the present invention has been created for the scenic arts, whether in the studio or elsewhere, it can be applied to assisting creation, for example to define the contours of new pieces of furniture or other objects. Likewise, it may be used in fashion, decoration and architecture.

Using the present invention it is a simple matter to copy the shape of a garment, an object, a house. In this case it simply suffices to follow with the light spot created by the projector in accordance with the invention the contours of the garment, the object or the house in question. These contours are memorised. The stored data may be used to control any type of equipment, such as cloth cutting tools for making a garment, for example. The recorded data may also be written for subsequent projection onto a screen, and then enlarged or reduced and so serve to make visible the recorded contour, for any creation, modification or other work to be carried out thereon.

I claim:

1. A method of establishing and scribing a pattern to be placed in a light beam for producing a desired contrasted light area on a screen, comprising the steps of:
   directing the light beam at the screen;
   providing a reference point in the light beam to form a contrasted light point on the screen;
   displacing the reference point in the light beam while viewing the contrasted light point on the screen in order to establish a trajectory of the contrasted light point defining the contour of the desired contrasted light area; and
   scribing on a pattern storage means a pattern corresponding to the displacement of the reference point.

2. The method according to claim 1, further comprising the step of placing the pattern of the pattern storage means into the light beam so as to project the desired contrasted light area on the screen.

3. The method according to claim 1, wherein the location of the pattern in the light beam is substantially that of the reference point during displacement in the light beam.

4. The method according to claim 1, wherein the displacement of the reference point is first recorded and then transferred to the pattern storage means.

5. The method according to claim 1, wherein the pattern storage means has a plurality of writable locations, and selectively bringing any one of the plurality writable location into position and scribing a pattern corresponding to a desired contrasted light area in the respective writable locations.

6. The method according to claim 1, wherein the reference point is provided in the pattern storage means and the pattern storage means is moved to effect the displacement of the reference point.

7. The method according to claim 1, wherein the reference point is provided in a plate separate from the pattern support means, and the plate is moved to effect the displacement of the reference point.

8. A device for establishing and scribing a pattern to be placed in a light beam for producing a desired contrasted light area on a screen, said device comprising a projection assembly including a light source for projecting a light beam at a screen, reference point means adapted to be arranged in the light beam to form a contrasted light point on the screen and displaceable to define a trajectory of the contrasted light point corresponding to the desired contrasted light area, recording means for recording the displacement of the reference point means, a pattern storage means adapted to be arranged in the light beam, scribing means cooperable with said pattern storage means for scribing a pattern thereon, and control means operatively connected to said recording means for controlling relative movement of said scribing means and said pattern storage means in cooperation with each other as a function of recorded displacement of the reference point means whereby the resulting pattern corresponds to desired contrasted light area.

9. The device according to claim 8, wherein said reference point means is defined in a plate, and means mounting the plate for movement of the reference point means in the light beam.

10. The device according to claim 8, wherein said reference point means is defined in said pattern storage means, and means mounting the pattern storage means for movement of the reference point in the light beam.

11. The device according to claim 8, wherein said pattern storage means has a plurality of writable locations, and means mounting the pattern storage means to selectively bring the writable locations into position for scribing the correspond by pattern.

12. The device according to claim 9, wherein said pattern storage means has a transparent location, said transparent location being in alignment with said reference point means in said plate when displacing the latter in the light beam.

13. The device according to claim 10, wherein said pattern storage means is of rectangular shape and said means mounting the pattern storage means for selectively bringing the writable locations into position in the light beam includes means for displacing the pattern storage means in mutually perpendicular directions.

14. The device according to claim 13, wherein said pattern storage means and said means mounting the pattern storage means are carried by a frame, said frame being pivotably mounted about mutually perpendicular tilt axes.

15. The device according to claim 10, wherein said pattern storage means is of disc shape and said means mounting the pattern means for selectively bringing the writable locations into position in the light beam includes means for angularly displacing the pattern storage means about an axis.

16. The device according to claim 8, wherein said scribing means has an operative position generally along the axis of the light beam for scribing the pattern on the pattern storage means and a retracted position in which the scribing means is spaced from the light beam.

17. The device according to claim 8, wherein said scribing means is mounted for movement relative to the pattern storage means for effecting the relative movement therebetween.

18. The device according to claim 8, wherein said pattern storage means is mounted for movement relative to said scribing means for effecting the relative movement therebetween.

* * * * *